(12) United States Patent  
Park (10) Patent No.: US 7,057,377 B1
(45) Date of Patent: Jun. 6, 2006

(54) Z-STATE CIRCUIT FOR SWITCHING REGULATORS

(75) Inventor: Sangbeom Park, Tracy, CA (US)

(73) Assignee: Ana Semiconductor, Tracy, CA (US)

( * ) Notice: Subject to any disclaimer, the term of this patent is extended or adjusted under 35 U.S.C. 154(b) by 4 days.

(21) Appl. No.: 11/021,522

(22) Filed: Dec. 23, 2004

(51) Int. Cl.
*H02M 1/14* (2006.01)
*H02H 7/10* (2006.01)
*G04F 1/44* (2006.01)

(52) U.S. Cl. .......................... 323/266; 323/901; 363/49
(58) Field of Classification Search ................ 323/266, 323/901, 908; 363/49, 50
See application file for complete search history.

(56) References Cited

U.S. PATENT DOCUMENTS 5,805,027 A * 9/1998 Yin ....................... 331/116 FE
5,903,451 A * 5/1999 Wu et al. ...................... 363/49
6,414,860 B1 * 7/2002 Li ................................ 363/49
6,807,075 B1 * 10/2004 Miermans ..................... 363/49
6,961,226 B1 * 11/2005 Mason et al. ................. 361/42

* cited by examiner

*Primary Examiner*—Bao Q. Vu (57) ABSTRACT

The four types of the Z-state circuits basically include a sensing gate, two stacked PMOS transistors, and a feedback line. The sensing gate senses a voltage at its input assuming no feedback is applied. Again, the corresponding output of two stacked PMOS transistors is assumed to be connected to the sensing input. Two stacked PMOS transistors generate a high impedance Z-state at its output according to the corresponding gate voltages. Therefore, the feedback line keeps sampling the output and feeding back the output voltage to the sensing input. Consequently, the feedback configuration provides the initial output voltage, which is the midpoint voltage decided by the device aspect ratios of the sensing gate before normal operation starts.

20 Claims, 6 Drawing Sheets

Z-STATE CIRCUIT FOR SWITCHING REGULATORS

FIELD OF THE INVENTION

The present invention relates to the field of z-state circuit and more particularly to z-state circuit for switching regulators.

BACKGROUND ART

Switching regulator is a vitally important devices. Switching regulators are building blocks used extensively in power systems, industry, motor, communication, networks, digital systems, consumer electronics, computers, and any other fields that high efficient voltage regulating functions.

Figure 1:
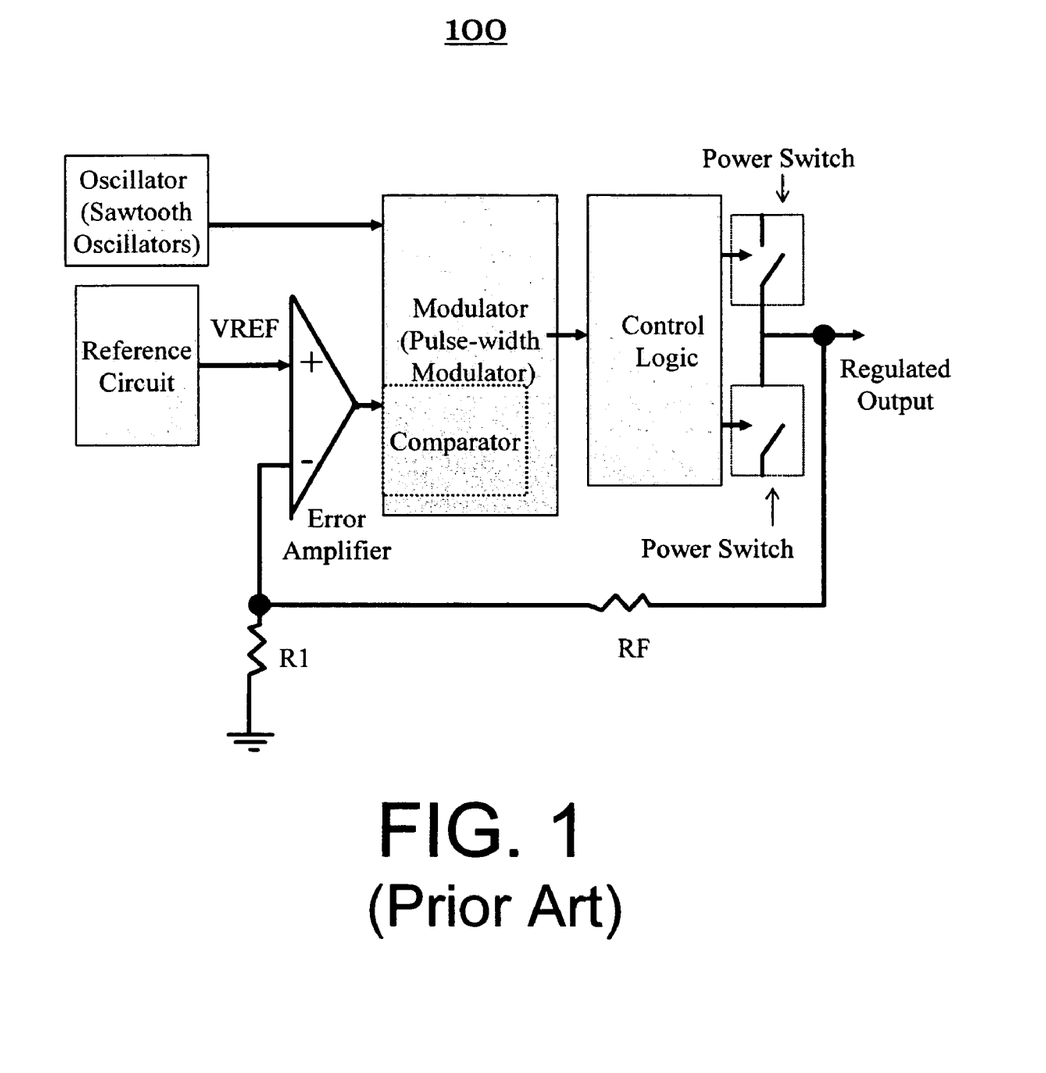
FIG. 1 illustrates a circuit diagram of a conventional switching regulator (i.e., DC-TO-DC converter).

Switching regulators (i.e., DC-TO-DC converters) can provide output voltages which can be less than, greater than, or of opposite polarity to the input voltage. Prior Art FIG. 1 illustrates a basic architecture of a conventional switching regulator 100. The conventional switching regulator 100 basically consists of an oscillator, a reference circuit, an error amplifier, a modulator including a comparator, resistors, and a control logic circuit. Control technique of switching regulators has typically used two modulators: a pulse-width modulator and a pulse-frequency modulator. The output dc level is sensed through the feedback loop including two resistors. An error amplifier compares this sampled output voltage and the reference voltage. The output of the error amplifier is compared against a periodic ramp generated by the saw tooth oscillator. The pulse-width modulator output passes through the control logic to the high voltage power switch. The feedback system regulates the current transfer to maintain a constant voltage within the load limits. In other words, it insures that the output voltage comes into regulation. However, it takes a long time until the output reaches the equilibrium after the system starts. Since a power supply of a core processor is connected to one of the outputs of switching regulators in most system applications, even the core processor should stand by until it receives the regulated output from the switching regulator, too. Therefore, unfortunately, the conventional switching regulator 100 of Prior Art FIG. 1 can not be efficiently implemented in integrated circuit (IC), system-on-chip (SOC), monolithic circuit, and discrete circuit since power and time are wasted until the output voltage of the switching regulator comes into regulation. In most switching regulator applications, it is highly desirable to start switching regulators to start immediately for higher power efficiency. In addition, the conventional switching regulator 100 has taken a long time to be simulated and verified before they are fabricated. The simulation time in designing the conventional switching regulator 100 is absolutely proportional to time to require the output voltage of the switching regulators to be regulated. Hence, this long simulation time adds additional cost and serious bottleneck to design time-to-market. In other words, the slow start-up of the switching regulator increases simulation time.

Thus, what is finally needed for a cost-effective switching regulator that can provide zero start-up time to increase power efficiency, reduce power and time consumption until the output voltage of switching regulators comes into regulation, and reduce significantly design time for better time-to-market. The present invention satisfies these needs by providing four embodiments utilizing a small number of transistors.

SUMMARY OF THE INVENTION

The present invention provides four types of the Z-state circuits for switching regulators. The Z-state circuits enable any switching regulators to attain zero start-up time. The simplest Z-state circuit of the present invention includes only six transistors. The concept of the Z-state circuits is a substantial reduction in the difference between the initial output voltage and the expected output voltage of switching regulators. The basic architecture of the Z-state circuits basically consists of a sensing gate, two stacked PMOS transistors, and a feedback line. The sensing gate senses a voltage at its output and two stacked PMOS transistors generate a high impedance Z-state at its output according to the corresponding gate input voltages. The feedback line keeps sampling the output and feeding back the output voltage to the sensing input.

Consequently, the feedback configuration provides the initial output voltage, which is the midpoint voltage decided by the device aspect ratios of the sensing gate before normal operation of switching regulator starts. All Z-state circuits cause a substantial reduction in the difference between the initial output voltage and the expected output voltage in order to solve many drawbacks simultaneously. In addition, the present invention has four different embodiments with a great improvement in start-up time, power consumption, and design time. One embodiment does not use power-down mode, whereas three embodiments utilize power-down mode.

BRIEF DESCRIPTION OF THE DRAWINGS

The accompanying drawings, which are incorporated in and form a part of this specification, illustrate four embodiments of the invention and, together with the description, serve to explain the principles of the invention.

Prior Art

DESCRIPTION OF THE PREFERRED EMBODIMENTS

In the following detailed description of the present invention, four types of the Z-state circuits, numerous specific details are set forth in order to provide a through understanding of the present invention. However, it will be obvious to one skilled in the art that the present invention may be practiced without these specific details. In other instances, well known methods, procedures, CMOS digital gates, components, and metal-oxide-semiconductor field-effect transistor (MOSFET) device physics have not been described in detail so as not to unnecessarily obscure aspects of the present invention.

Figure 2:
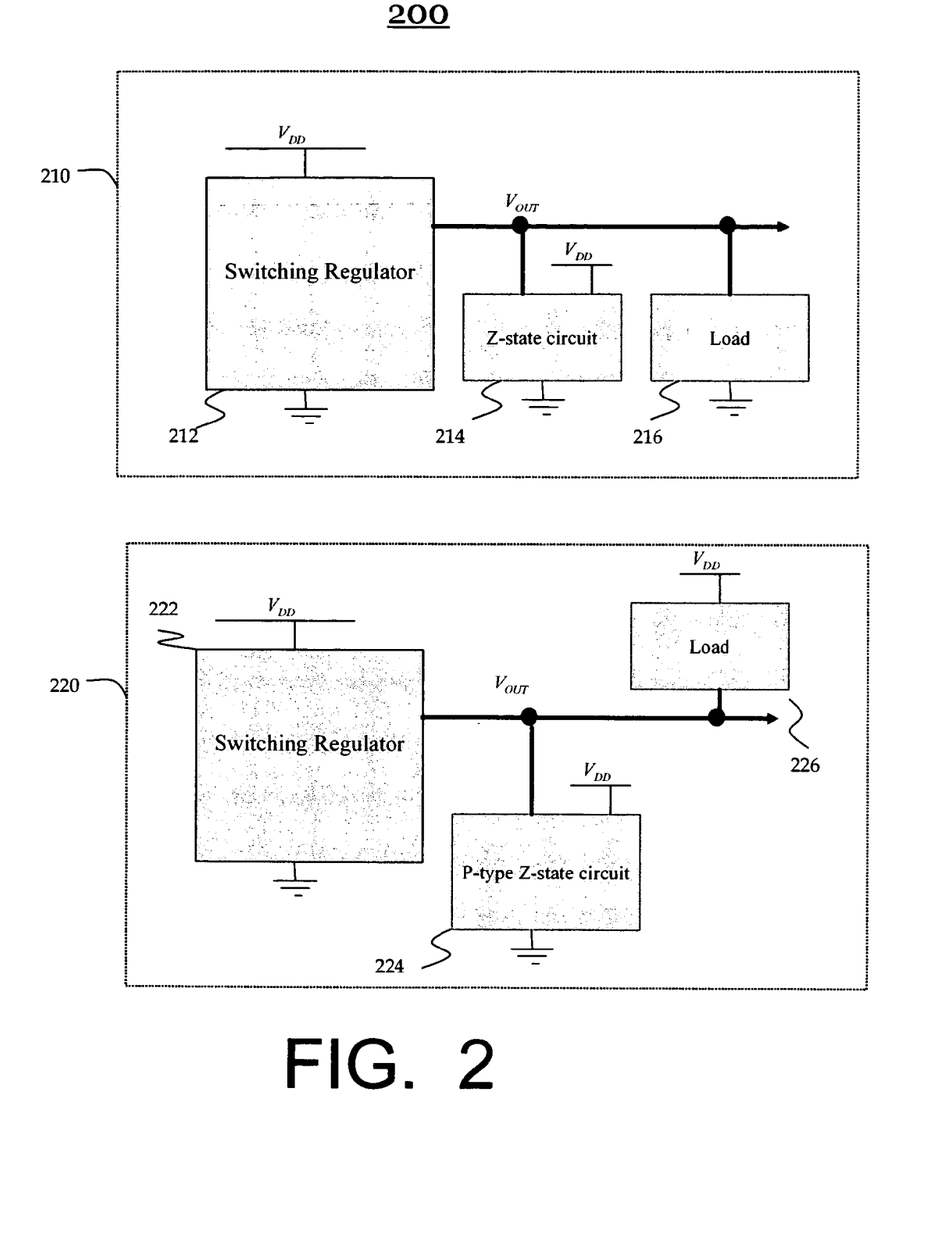
FIG. 2 illustrates a diagram of two types of Z-state circuits for switching regulators in accordance with the present invention.

FIG. 2 illustrates two types of the Z-state circuits for switching regulators in accordance with the present invention. One type of the Z-state circuits are applied for switching regulators driving a load 216 connected between $V_{OUT}$ and ground, as seen in the switching regulator system 210 shown in FIG. 2. The other type of the p-type Z-state circuits are applied for switching regulators driving a load 226 connected between $V_{DD}$ and $V_{OUT}$, as seen in the switching regulator system 220 shown in FIG. 2. To reduce the difference between the initial output voltage and the expected output voltage of the switching regulator, the output of all the Z-state circuits is coupled to the output of switching regulators, as shown in FIG. 2. The switching regulator 212 represents all types of switching regulators (i.e., DC-TO-DC converter) driving a load 216 connected between $V_{OUT}$ and ground without regard to the architecture of switching regulators because the applications of the Z-state circuit 214 is independent of architecture or types of switching regulators. The switching regulator 222 represents all types of switching regulators (i.e., DC-TO-DC converter) driving a load 226 connected between $V_{DD}$ and $V_{OUT}$ without regard to the architecture of switching regulators because the applications of the Z-state circuit 224 is independent of architecture or types of switching regulators. All the Z-state circuits of the present invention use a small number of transistors.

Figure 3:
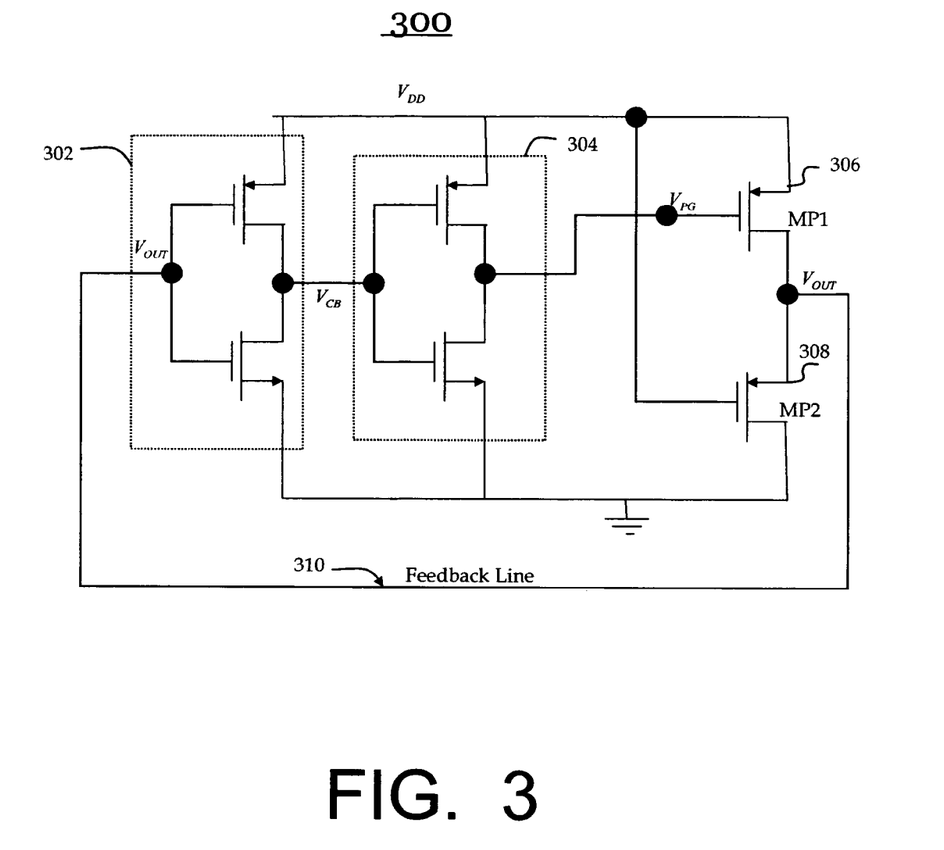
FIG. 3 illustrates a circuit diagram of a simple Z-state circuit according to the present invention.

FIG. 3 illustrates a circuit diagram of a simple Z-state circuit 300 according to the present invention. This simple Z-state circuit 300 is the simplest circuit among four embodiments of the invention. In practice, the simple Z-state circuit 300 is a feedback circuit that consists of a sensing inverter (i.e., an odd number of sensing inverters), a second inverter 304, two stacked PMOS transistors 306 and 308, and a feedback line 310. In addition, it should be aware that the gate of the lower PMOS transistor 308 is connected to $V_{DD}$ in order to turn off the lower PMOS transistor 308 all the time. The simple Z-state circuit 300 is shown in FIG. 3, where $V_{OUT}$ is the output (=input) voltage with feedback 310 applied. First, assuming that feedback 310 is not present and thus the input and output are not tied together. In other words, the input and output without feedback 310 applied are the input of the sensing inverter 302 and output of two PMOS transistors 306 and 308, respectively. The sensing inverter 302 senses a voltage at its input. However, the input voltage is zero initially when the system is started. Since the input voltage of the sensing inverter 302 is zero, the output of the sensing inverter 302 is at $V_{DD}$. Thus, the output of the second inverter 304 is at ground to turn on the upper PMOS transistor 306, which provides an output pull-up path to $V_{DD}$ so that the output is at $V_{DD}$. Second, the output of two stacked PMOS transistors 306 and 308 is assumed to be connected to the input of the sensing inverter 302. Since the input voltage of the sensing inverter 302 is $V_{DD}$, the output voltage of the sensing inverter 302, $V_{CB}$, is zero and thus the output voltage of the second inverter 304, $V_{PG}$, is $V_{DD}$ to turn off the upper PMOS transistor 306. At this moment, two PMOS transistors 306 and 308 are off and the output is referred to as being in a high impedance Z-state. In other words, the output becomes a high impedance node that has no driving capability. However, in reality, it is noted that feedback 310 is applied in the simple Z-state circuit 300 of the present invention. Thus, the feedback keeps sampling the output and feeding back the output voltage to the sensing input. Consequently, the simple Z-state circuit 300 in the feedback configuration provides the initial output voltage, which is the midpoint voltage decided by the device aspect ratios of the sensing inverter. As a result, a very small amount of current from the drain of the upper PMOS transistor 306 flows into a load while no current flows into the source of the lower PMOS transistor 308.

In applications of the simple Z-state circuit 300 shown in FIG. 3, it is desirable to use the load 216 connected to $V_{OUT}$ and ground for all kinds of switching regulators (i.e., DC-to-DC converters). It was just stated that the initial output voltage is determined by the device aspect ratios of the sensing inverter 302. The midpoint voltage is a voltage where the input voltage and the output voltage of the inverter are equal in the voltage transfer characteristic. At the midpoint voltage, the transistors of the inverter operate in the saturation mode. This midpoint voltage of inverter is expressed as $$\frac{V_{DD} - V_{T_n} - |V_{T_p}|}{1 + \sqrt{\frac{K_n}{K_p}}} + V_{T_n} \text{ where } \frac{K_n}{K_p} = \frac{\mu_n C_{OX}\left(\frac{W}{L}\right)_n}{\mu_p C_{OX}\left(\frac{W}{L}\right)_p}$$

The initial output voltage will cause a substantial reduction in the difference between the initial output voltage and the expected output voltage of any switching regulators (i.e., DC-TO-DC converters) including the switching regulator 212.

It is a good idea to use a value for the midpoint voltage less than the voltage that makes the output voltage of the switching regulators equal to the regulated output voltage. In order that the proper value of the midpoint voltage be chosen, the CMOS process variations usually must be considered. In addition, each bulk of two PMOS transistors 306 and 308 can be connected to its own N-well to obtain better immunity from substrate noise. The desirable features and the advantages of the simple Z-state circuit 300 will be discussed later.

Figure 4:
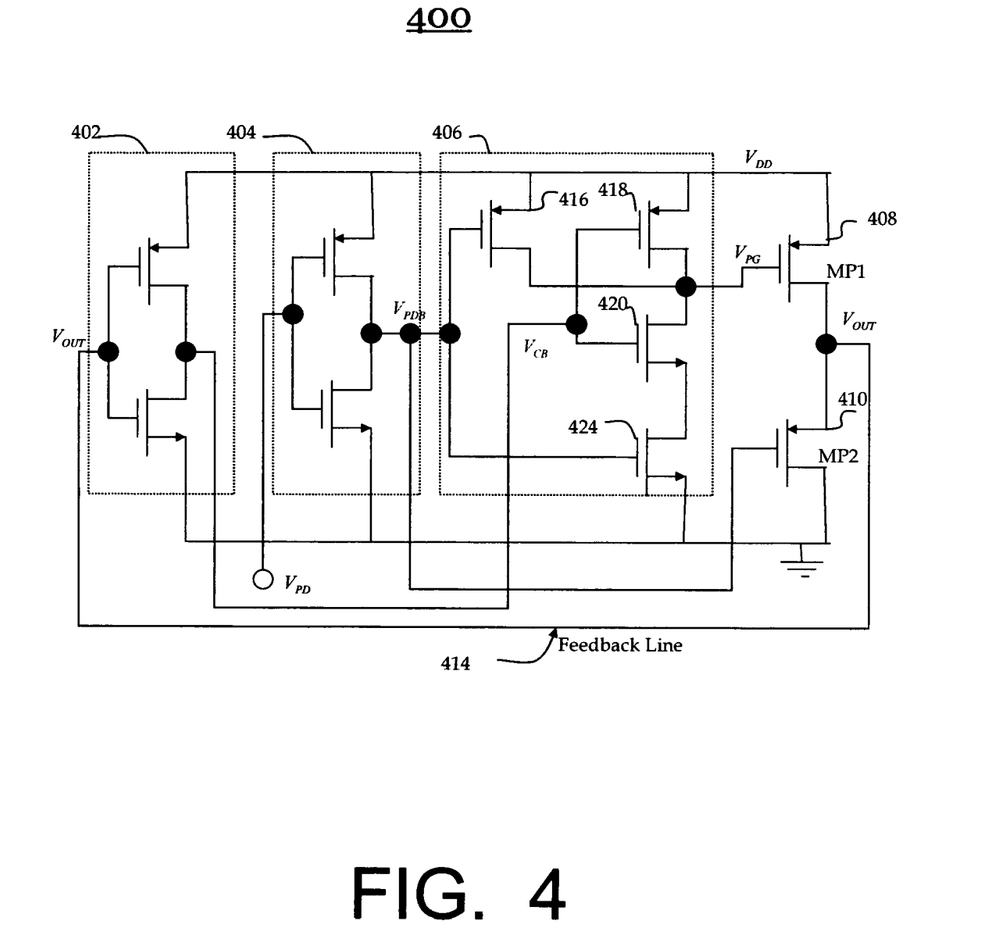
FIG. 4 illustrates a circuit diagram of a power-down enable Z-state circuit in accordance with the present invention.

FIG. 4 illustrates a circuit diagram of a power-down enable Z-state circuit 400 in accordance with the present invention. This power-down enable Z-state circuit 400 is a power-down enable embodiment of the invention. The power-down input voltage, $V_{PD}$, is defines as the input voltage for the power down mode. The power-down enable system is in power down mode when $V_{PD}$ is $V_{DD}$ and it is in normal mode when $V_{PD}$ is zero. The power-down enable Z-state circuit 400 is a feedback circuit that consists of a sensing inverter 402 (i.e., an odd number of sensing inverters), a power-down inverter 404, a NAND gate 406, two stacked PMOS transistors 408 and 410, and a feedback line 414. The power-down enable Z-state circuit 400 is shown in FIG. 4, where $V_{OUT}$ is the output (=input) voltage with feedback applied. First, it is assumed that feedback 414 is not present and thus the input and output are not the same. In other words, the input and output without feedback 414 applied are the input of the sensing inverter 402 and output of two PMOS transistors 408 and 410, respectively. The sensing inverter 402 senses a voltage at its input when the circuit mode changes from power-down mode to normal mode after its start-up. Since the input voltage of the power-down inverter 404, $V_{PD}$, becomes zero during normal mode, the output voltage of the power-down inverter 404, $V_{PDB}$, is $V_{DD}$. At the same time, since the input of the sensing inverter 402 initially is at ground, the output of the sensing inverter 402 becomes at $V_{DD}$. It is noted that since the gate voltage of the lower PMOS transistor 410, $V_{PDB}$, is $V_{DD}$, the lower PMOS transistor 410 is off during normal mode. With two input voltages, $V_{PDB}=V_{DD}$ and $V_{CB}=V_{DD}$, the output of the CMOS NAND gate 406 is at ground to turn on the upper PMOS transistor 408, which provides an output pull-up path to $V_{DD}$ so that the output is at $V_{DD}$. Second, the output of two stacked PMOS transistors 408 and 410 is assumed to be connected to the input of the sensing inverter 402. Since the input voltage of the sensing inverter 402 is $V_{DD}$, the output voltage of the sensing inverter 402, $V_{CB}$, is zero. With two input voltages, $V_{PDB}=V_{DD}$ and $V_{CB}=0$, the output of the CMOS NAND gate 406 is at $V_{DD}$ to turn off the upper PMOS transistor 408. At this moment, two PMOS transistors 408 and 410 are off and the output is referred to as being in a high impedance Z-state. Thus, the output becomes a high impedance node that has no driving capability. However, in reality, it is noted that feedback 414 is applied in the power-down enable Z-state circuit 400 of the present invention. Thus, the feedback line keeps sampling the output and feeding back the output voltage to the sensing input. Consequently, the power-down enable Z-state circuit 400 in the feedback configuration provides the initial $V_{OUT}$, which is the midpoint voltage decided by the device aspect ratios of the sensing inverter 402. As a result, a very small amount of current from the drain of the upper PMOS transistor 408 flows into a load while no current flows into the source of the lower PMOS transistor 410.

For application of the power-down enable Z-state circuit 400 shown in FIG. 4, it is desirable to use the load 216 connected to $V_{OUT}$ and ground for any switching regulators (i.e., DC-TO-DC converters). Also, the initial output voltage is defined to be approximately the midpoint voltage of the sensing inverter as in the simple Z-state circuit of FIG. 3.

Also, as seen in the CMOS NAND gate 406 shown in FIG. 4, the gate terminal of the left PMOS transistor 416 is coupled to the gate terminal of the lower NMOS transistor 424, and the gate terminal of the right PMOS transistor 418 is coupled to the gate terminal of the upper NMOS transistor 420, with these device pair connections serving as inputs to the CMOS NAND gate circuit 406. The gate terminal of the left PMOS transistor 416 and the lower NMOS transistor 424 serves as the inverting power-down input and the gate terminal of the right PMOS transistor 418 and the upper NMOS transistor 420 serves as the logical input, as shown in FIG. 4. Those skilled in the art will recognize that with minor modifications, these input schemes may be reversed with the gate terminal of the left PMOS transistor 416 and the lower NMOS transistor 424 serving as the logical input and the gate terminal of the right PMOS transistor 418 and the upper NMOS transistor 420 serving as the inverting power-down input. In addition, those skilled in the art will recognize that with minor modifications, the coupling scheme may be reversed with the gate terminal of the left PMOS transistor 416 being coupled to the gate terminal of the upper NMOS transistor 420, and the gate terminal of the right PMOS transistor 418 being coupled to the gate terminal of the lower NMOS transistor 424. Hence, the reversed coupling scheme allows following input schemes: 1. The gate terminal of the left PMOS transistor 416 and the upper NMOS transistor 420 serves as the inverting power-down input and the gate terminal of the right PMOS transistor 418 and the lower NMOS transistor 424 serves as the logical input. 2. The gate terminal of the left PMOS transistor 416 and the upper NMOS transistor 420 serves as the logical input and the gate terminal of the right PMOS transistor 418 and the lower NMOS transistor 424 serves as the inverting power-down input.

The initial $V_{OUT}$ will cause a substantial reduction in the difference between the initial output voltage and the expected output voltage of any switching regulators (i.e., DC-TO-DC converters) including the switching regulator 212. In design of the power-down enable Z-state circuit of FIG. 4, it is also desirable to use a value for the midpoint voltage less than the voltage that makes the output voltage of the switching regulators equal to the regulated output voltage. As mentioned earlier in the simple Z-state circuit of FIG. 3, the CMOS process variations usually must be considered so that the proper value of the midpoint voltage is chosen for the power-down enable Z-state circuit of FIG. 4. In addition, each bulk of two PMOS transistors 408 and 410 can be connected to its own N-well to obtain better immunity from substrate noise. The desirable features and the advantages of the power-down enable Z-state circuit 400 will be discussed later.

To understand power down mode, the following case will be considered. Since the power-down input voltage, $V_{PD}$, becomes $V_{DD}$ for power-down mode, the output voltage of the power-down inverter, $V_{PDB}$, is zero. In other words, the lower PMOS transistor 410 is on during power-down mode and thus provides an output pull-down path to ground. Thus, $V_{OUT}$ of the power-down enable Z-state circuit 400 is zero during power-down mode. Zero dc volt at $V_{OUT}$ ensures that no current flows into the circuits during power-down mode. At this point, to realize this power-down mode, one should use the load 216 connected to $V_{OUT}$ and ground. The present invention offers the above advantages by simply providing a power-down enable z-state circuit utilizing only ten transistors that all require smaller sizes of the lengths and widths of the transistor.

Figure 5:
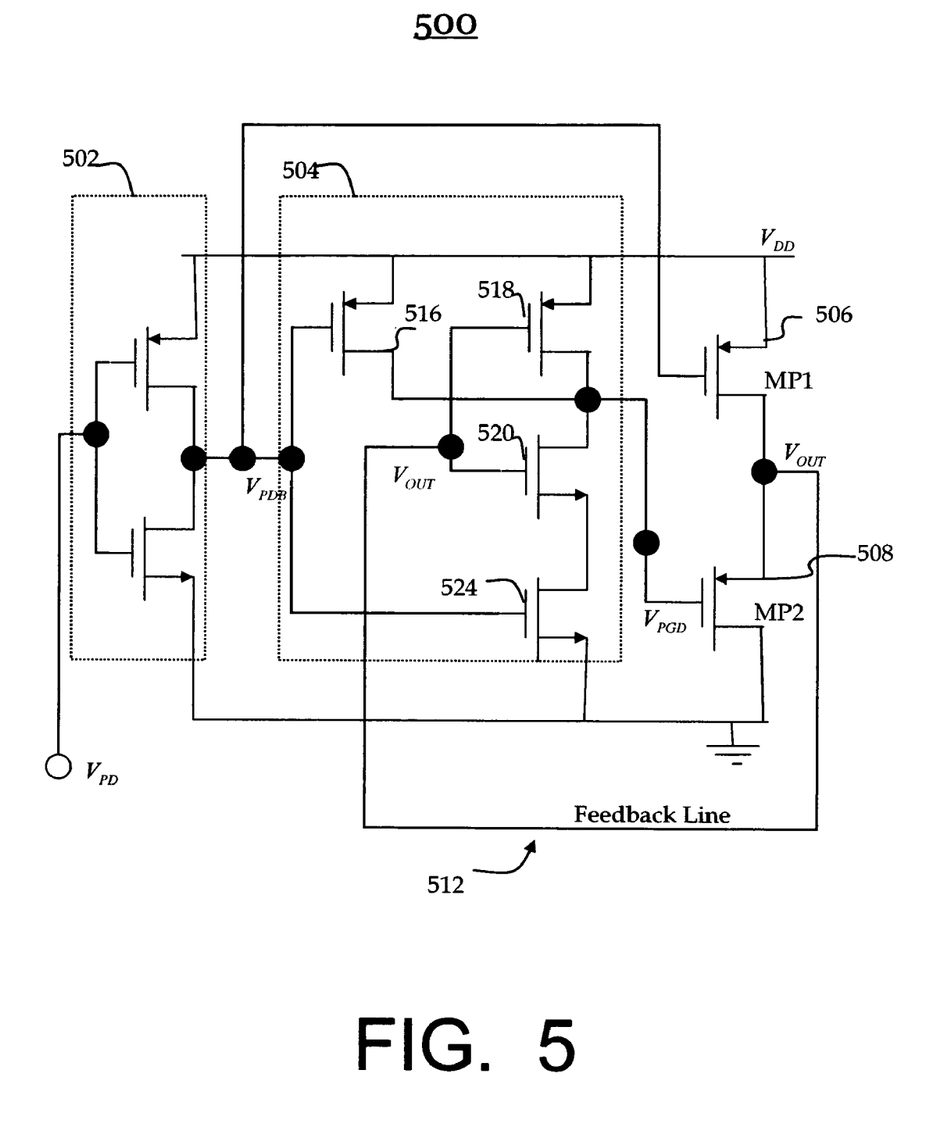
FIG. 5 illustrates a circuit diagram of a p-type power-down enable Z-state circuit according to the present invention.

FIG. 5 illustrates a circuit diagram of a p-type power-down enable Z-state circuit 500 according to the present invention. This p-type power-down enable Z-state circuit 500 is the other power-down enable embodiment of the invention. The power-down input voltage, $V_{PD}$, is defines as the input voltage for the p-type power down mode as well as for the power down mode. For simplicity, p-type power down mode can also be termed the power-down mode, too.

The p-type power-down enable Z-state circuit 500 is a feedback circuit that consists of a power-down inverter 502 (i.e., an odd number of power-down inverters), a sensing NAND gate 504, two stacked PMOS transistors 506 and 508, and a feedback line 512. It is noted here that a two-input CMOS NAND gate 504 has the same midpoint voltage as an inverter since the two-input CMOS NAND gate can be used as an enabling inverter with one input serving as an active high enable input and the other used as the sensing input. Assuming the enable input voltage is $V_{DD}$, the midpoint voltage of the sensing CMOS NAND gate 504 is a voltage where the sensing input voltage and the output voltage of the CMOS NAND gate are equal in the voltage transfer characteristic. Thus, the midpoint voltage is decided by the device aspect ratios of the CMOS NAND gate 504.

The p-type power-down enable Z-state circuit 500 shown in FIG. 5, where $V_{OUT}$ is the output (=input) voltage with feedback 512 applied. First, it is assumed that feedback 512 is open and thus the sensing input and output are not connected together. In other words, the input and output without feedback 512 are the sensing input of the sensing NAND gate 504 and output of two PMOS transistors 506 and 508, respectively. The sensing NAND gate 504 senses $V_{DD}$ at its sensing input when the circuit mode changes from power-down mode to normal mode after its start-up. The reason why the sensing input of the sensing NAND gate 504 is $V_{DD}$ is that the output voltage of the power-down inverter 502, $V_{PDB}$, was zero, which turned on upper PMOS transistor 506 and thus provided an output pull-up path to $V_{DD}$ during previous power-down mode. Since the power-down input voltage, $V_{PD}$, becomes zero during normal mode, the output voltage of the power-down inverter, $V_{PDB}$ is $V_{DD}$. In other words, the gate voltage of the upper PMOS transistor 506, $V_{PDB}$, is $V_{DD}$ to turn off the upper PMOS transistor 506 during normal mode. Since the active high enable input and sensing input voltage of the sensing NAND gate 504 are $V_{DD}$, the output of the sensing NAND gate 504 is at ground to turn on the lower PMOS transistor 508, which provides an output pull-down path to ground so that the output is at ground. Second, the output of two stacked PMOS transistors 506 and 508 is assumed to be connected to the sensing input of the sensing CMOS NAND gate 504. Since the sensing input voltage of the sensing CMOS NAND gate 504 becomes zero and the other enable input voltage, $V_{PDB}$, is $V_{DD}$, the output of the CMOS NAND gate 504 is at $V_{DD}$ to turn off the lower PMOS transistor 508. At this moment, two PMOS transistors 506 and 508 are off and the output is referred to as being in a high impedance Z-state. Thus, the output of two PMOS transistors 506 and 508 becomes a high impedance node that has no driving capability. However, in reality, it is noted that feedback 512 is applied in the present invention. Therefore, the feedback line keeps sampling the output and feeding back the output voltage to the sensing input. Finally, the p-type power-down enable Z-state circuit 500 in the feedback configuration provides the initial $V_{OUT}$, which is the midpoint voltage decided by the device aspect ratios of the sensing CMOS NAND gate 504. As a result, a very small amount of current flows out of a load and flows into the source of the lower PMOS transistor 508 while no current flows out of the drain of the upper PMOS transistor 506.

For application of the p-type power-down enable Z-state circuit 500 shown in FIG. 5, it is desirable to use the load 226 connected to $V_{DD}$ and $V_{OUT}$ for any switching regulators (i.e., DC-TO-DC converters). The initial $V_{OUT}$ is approximately the midpoint voltage of the sensing CMOS NAND gate as that of the sensing inverter in the simple Z-state circuit of FIG. 3 and the power-down enable Z-state circuit of FIG. 4. The initial $V_{OUT}$ condition will cause a substantial reduction in the difference between the initial output voltage and the expected output voltage of any switching regulators (i.e., DC-TO-DC converters) including the switching regulator 222.

Also, as seen in the sensing CMOS NAND gate 504 shown in FIG. 5, the gate terminal of the left PMOS transistor 516 is coupled to the gate terminal of the lower NMOS transistor 524, and the gate terminal of the right PMOS transistor 518 is coupled to the gate terminal of the upper NMOS transistor 520, with these device pair connections serving as inputs to the sensing CMOS NAND gate circuit 504. The gate terminal of the left PMOS transistor 516 and the lower NMOS transistor 524 serves as the inverting power-down input and the gate terminal of the right PMOS transistor 518 and the upper NMOS transistor 520 serves as the sensing input, as shown in FIG. 5. Those skilled in the art will recognize that with minor modifications, these input schemes may be reversed with the gate terminal of the left PMOS transistor 516 and the lower NMOS transistor 524 serving as the sensing input and the gate terminal of the right PMOS transistor 518 and the upper NMOS transistor 520 serving as the inverting power-down input. In addition, those skilled in the art will recognize that with minor modifications, the coupling scheme may be reversed with the gate terminal of the left PMOS transistor 516 being coupled to the gate terminal of the upper NMOS transistor 520, and the gate terminal of the right PMOS transistor 518 being coupled to the gate terminal of the lower NMOS transistor 524. Hence, the reversed coupling scheme allows following input schemes: 1. The gate terminal of the left PMOS transistor 516 and the upper NMOS transistor 520 serves as the inverting power-down input and the gate terminal of the right PMOS transistor 518 and the lower NMOS transistor 524 serves as the sensing input. 2. The gate terminal of the left PMOS transistor 516 and the upper NMOS transistor 520 serves as the sensing input and the gate terminal of the right PMOS transistor 518 and the lower NMOS transistor 524 serves as the inverting power-down input.

In design of the p-type power-down enable Z-state circuit 500 shown in FIG. 5, it is also desirable to use a value for the midpoint voltage greater than the voltage that makes the output voltage of the switching regulators equal to the regulated output voltage. As mentioned earlier in the simple Z-state circuit of FIG. 3 and power-down enable Z-state circuit of FIG. 4, the CMOS process variations usually must be considered so that the proper value of the midpoint voltage is chosen for the p-type power-down enable Z-state circuit 500. In addition, each bulk of two PMOS transistors 506 and 508 can be connected to its own N-well to obtain better immunity from substrate noise. The desirable features and the advantages of the p-type power-down enable Z-state circuit 500 will be discussed later.

To understand power down mode, the following case will be considered. The p-type power-down enable system is in power down mode when the power-down input voltage, $V_{PD}$, is $V_{DD}$ and it is in normal mode when $V_{PD}$ is zero. If $V_{PD}$ becomes $V_{DD}$ during power-down mode, the output voltage of the power-down inverter, $V_{PDB}$, is zero, which turns on upper PMOS transistor during power-down mode and thus provides an output pull-up path to $V_{DD}$. Thus, $V_{OUT}$ of the p-type power-down enable Z-state circuit 500 is $V_{DD}$. $V_{OUT}=V_{DD}$ ensures that no current flows into the circuits during power-down mode. At this point, to realize this power-down mode for all building blocks, one should use the load 226 connected to $V_{DD}$ and $V_{OUT}$. For this configuration shown in FIG. 5, $V_{OUT}$ must be $V_{DD}$ during power-down mode to ensure that no current flows into the circuits. On the contrary, it was stated earlier that $V_{OUT}$ must be zero when power-down mode occurs in FIG. 4.

Figure 6:
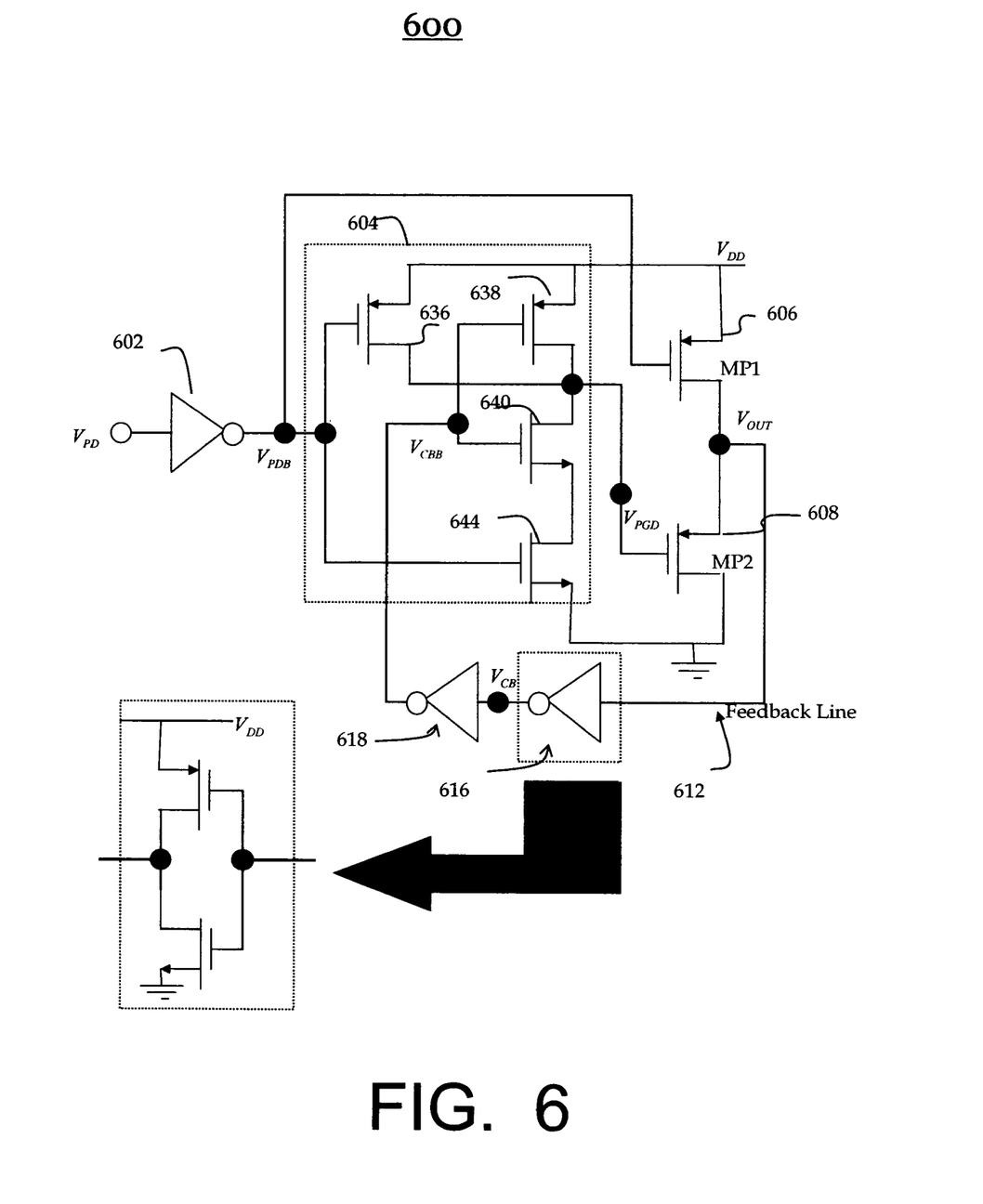
FIG. 6 illustrates a circuit diagram of a modified p-type power-down enable Z-state circuit in accordance with the present invention.

FIG. 6 illustrates a circuit diagram of a modified p-type power-down enable Z-state circuit 600 in accordance with the present invention. The p-type power-down enable Z-state circuit 600 shown in FIG. 6 is a feedback circuit that consists of a power-down inverter 602 (i.e., an odd number of power-down inverters), a NAND gate 604, two sensing inverters 616 and 618 (i.e., an even number of sensing inverters), two stacked PMOS transistors 606 and 608, and a feedback line 612. This circuit 600 is a modification of the circuit described in FIG. 5 and has two other additional inverters compared to FIG. 5.

The modified p-type power-down enable Z-state circuit 600 shown in FIG. 6, where $V_{OUT}$ is the output (=input) voltage with feedback 612 applied. First, to understand the operation of the modified p-type power-down enable Z-state circuit 600, it is necessary to make the assumption that feedback 612 is open and thus the input and output are not connected each other. The first sensing inverter 616 senses at $V_{DD}$ its sensing input when the circuit mode changes from power-down mode to normal mode after its start-up. The reason why the sensing input of the first sensing inverter 616 is $V_{DD}$ is that the output voltage of the power-down inverter 602, $V_{PDB}$, was zero, which turned on upper PMOS transistor 606 and thus provided an output pull-up path to $V_{DD}$ during previous power-down mode. Since the power-down input voltage, $V_{PD}$, becomes zero during normal mode, the output voltage of the power-down inverter 602, $V_{PDB}$, is $V_{DD}$. Thus, the gate voltage of the upper PMOS transistor 606, $V_{PDB}$, is $V_{DD}$ to turn off the upper PMOS transistor 606 during normal mode. At the same time, since the input of the first sensing inverter 616 is at $V_{DD}$, the output voltage of the second sensing inverter 618 is $V_{DD}$. With two input voltages, $V_{PDB}=V_{DD}$ and $V_{CBB}=V_{DD}$, the output of the CMOS NAND gate 604 is at ground to turn on the lower PMOS transistor 608, which provides an output pull-down path to ground so that the output is at ground. Second, the output of two stacked PMOS transistors 606 and 608 is assumed to be connected to the input of the first sensing inverter 616. Since the input voltage of the first sensing inverter 616 becomes zero, the output voltage of the second sensing inverter 618, $V_{CBB}$, is zero. Also, the output voltage of the power-down inverter 602, $V_{PDB}$, is $V_{DD}$ during normal mode. With two input voltages, $V_{PDB}=V_{DD}$ and $V_{CBB}=0$, the output of the CMOS NAND gate 604 is at $V_{DD}$ to turn off the lower PMOS transistor 608. At this moment, two PMOS transistors 606 and 608 are off and the output is referred to as being in a high impedance Z-state. However, in reality, it is noted that feedback 612 is applied in the present invention. Therefore, the feedback line keeps sampling the output and feeding back the output voltage to the sensing input. Finally, the modified p-type power-down enable Z-state circuit 600 in the feedback configuration provides the initial $V_{OUT}$, which is approximately the midpoint voltage decided by the device aspect ratios of the first sensing inverter 616. It should be noted that the operation and principles of the circuit shown in FIG. 6 are the same as those of the circuit shown in FIG. 5. However, the difference to note here in FIG. 6 is to utilize an inverter to sense the output voltage, $V_{OUT}$. In other words, the NAND gate 504 shown in FIG. 5 was used as a sensing gate, but the NAND gate 604 shown in FIG. 6 does not function as a sensing gate any more. As a result, a very small amount of current flows out of a load and flows into the source of the lower PMOS transistor 608 while no current flows out of the drain of the upper PMOS transistor 606.

For application of the modified p-type power-down enable Z-state circuit 600 shown in FIG. 6, it is desirable to use the load 226 connected to $V_{DD}$ and $V_{OUT}$ for any switching regulators (i.e., DC-TO-DC converters). The initial $V_{OUT}$ condition will cause a substantial reduction in the difference between the initial output voltage and the expected output voltage of any switching regulators (i.e., DC-TO-DC converter) containing the switching regulator 222.

Also, as seen in the CMOS NAND gate 604 shown in FIG. 6, the gate terminal of the left PMOS transistor 636 is coupled to the gate terminal of the lower NMOS transistor 644, and the gate terminal of the right PMOS transistor 638 is coupled to the gate terminal of the upper NMOS transistor 640, with these device pair connections serving as inputs to the CMOS NAND gate circuit 604. The gate terminal of the left PMOS transistor 636 and the lower NMOS transistor 644 serves as the inverting power-down input and the gate terminal of the right PMOS transistor 638 and the upper NMOS transistor 640 serves as the logical input, as shown in FIG. 6. Those skilled in the art will recognize that with minor modifications, these input schemes may be reversed with the gate terminal of the left PMOS transistor 636 and the lower NMOS transistor 644 serving as the logical input and the gate terminal of the right PMOS transistor 638 and the upper NMOS transistor 640 serving as the inverting power-down input. In addition, those skilled in the art will recognize that with minor modifications, the coupling scheme may be reversed with the gate terminal of the left PMOS transistor 636 being coupled to the gate terminal of the upper NMOS transistor 640, and the gate terminal of the right PMOS transistor 638 being coupled to the gate terminal of the lower NMOS transistor 644. Hence, the reversed coupling scheme allows following input schemes: 1. The gate terminal of the left PMOS transistor 636 and the upper NMOS transistor 640 serves as the inverting power-down input and the gate terminal of the right PMOS transistor 638 and the lower NMOS transistor 644 serves as the logical input. 2. The gate terminal of the left PMOS transistor 636 and the upper NMOS transistor 640 serves as the logical input and the gate terminal of the right PMOS transistor 638 and the lower NMOS transistor 644 serves as the inverting power-down input.

For design of the modified p-type power-down enable Z-state circuit 600 shown in FIG. 6, it is also desirable to use a value for the midpoint voltage greater than the voltage that makes the output voltage of the switching regulators equal to the regulated output voltage. As mentioned before, the CMOS process variations usually must be considered so that the proper value of the midpoint voltage is chosen for the modified p-type power-down enable Z-state circuit shown in FIG. 6. In addition, each bulk of two PMOS transistors 606 and 608 can be connected to its own N-well to obtain better immunity from substrate noise.

The p-type power-down enable system is in power down mode when the power-down input voltage, $V_{PD}$, is $V_{DD}$ and it is in normal mode when $V_{PD}$ is zero. The p-type power down mode of FIG. 6 is the same as that of FIG. 5. Thus, $V_{OUT}=V_{DD}$ ensures that no current flows into the circuits during power-down mode. At this point, to realize this power-down mode for all building blocks, one should use the load 226 connected to $V_{DD}$ and $V_{OUT}$. The desirable features and the advantages of the modified p-type power-down enable Z-state circuit 600 will be discussed later. The present invention offers the above advantages by simply providing a modified p-type power-down enable Z-state circuit 600 utilizing only twelve transistors that all require smaller sizes of the lengths and widths of the transistor.

In summary, the four types of the Z-state circuits 300, 400, 500, and 600 of the present invention within the switching regulator systems 210 and 220 make the initial output voltage of switching regulator closer to its regulated output voltage so that any switching regulators quickly come in regulations. The switching regulator including four types of the Z-state circuits 300, 400, 500, and 600 have the following advantages: a minimization of start-up time of switching regulators, a reduction in power and time consumption until regulation, higher power efficiency, and a significant reduction in design time for better time-to-market, a higher performance.

The Z-state circuit 214 shown in FIG. 2 represents the simple Z-state circuit 300 and the power-down enable Z-state circuit 400, as shown in FIG. 4 and FIG. 5, respectively. Also, the p-type Z-state circuit 224 shown in FIG. 2 represents the p-type power-down enable Z-state circuit 500 and the modified p-type power-down enable Z-state circuit 600, as shown in FIG. 5 and FIG. 6, respectively. It is noted that SPICE is used for the simulation of switching regulators. The conventional switching regulator 100 and the switching regulator systems 210 including the Z-state circuit 214 are simulated using the same blocks. As a result, the total simulation time of the conventional switching regulator 100 is 40 hours and that of the switching regulator systems

210 is 3 hours. It also takes about 3 hours to simulate the switching regulator systems 220 including the p-type Z-state circuit 224. This improvement can be accomplished by simply inserting one of any Z-state circuits into any conventional switching regulators including the conventional switching regulator 100, and the simulation time has been reduced by a factor of 13. It should be also noted that the same time step has been used for the SPICE simulation in order to accurately measure and compare the simulation time of all circuits.

The present invention, four types of the Z-state circuits, simply utilizes a Z-state circuit in order to reduce the cost, inefficiency, power, time, and complexity and simply inserts a cost-effective Z-state circuit into the conventional switching regulator 100 in order to achieve many advantages. The Z-state circuits of the present invention are very efficient to implement in integrated circuit (IC), system-on-chip (SOC), monolithic circuit, or discrete circuit. While the present invention has been described in particular embodiments, it should be appreciated that the present invention should not be construed as being limited by such embodiments, but rather construed according to the claims below.

What is claimed is:

1. A Z-state circuit for making any switching regulator very efficient, comprising:
   a feedback line connected with the output and input of the Z-state circuit coupled to the output of the switching regulators;
   a sensing inverter for sensing a voltage at the output and comparing with the midpoint voltage decided by the device aspect ratios of the sensing inverter;
   a two-input CMOS NAND gate for being used as an enabling inverter with one input serving as an inverting power-down input and the other used as the logical input; and
   two stacked PMOS transistors for generating a high impedance Z-state at its output according to the corresponding gate voltages.

2. The circuit as recited in claim 1 wherein an odd number of power-down inverters are further added to turn off all transistors and CMOS gates so that no current flows into the circuit during power-down mode.

3. The circuit as recited in claim 1 wherein the sensing inverter is inverter.

4. The circuit as recited in claim 1 wherein the sensing inverter is comparator.

5. The circuit as recited in claim 1 wherein the sensing inverter is operational amplifier.

6. The circuit as recited in claim 1 wherein the sensing inverter is CMOS NAND gate since the two-input CMOS NAND gate can be used as an enabling inverter with one input serving as an active high enable input and the other used as the logical input.

7. The circuit as recited in claim 1 wherein the sensing inverter is CMOS NOR gate since the two-input CMOS NOR gate can be used as an enabling inverter with one input serving as an active low enable input and the other used as the logical input.

8. The circuit as recited in claim 1 wherein the Z-state circuit is simple Z-state circuit if the gate terminal of the lower PMOS transistor is coupled to power supply by replacing the CMOS NAND gate by an inverter.

9. The circuit as recited in claim 1 wherein the output of the Z-state circuit is coupled to a load connected between the output and ground.

10. The circuit as recited in claim 9 wherein the output of the Z-state circuit is at ground to ensure that no current flows into the circuit when the power-down input is at the power supply.

11. The circuit as recited in claim 9 wherein the gate terminal of the upper PMOS transistors is coupled to the output of the CMOS NAND gate while the gate terminal of the lower PMOS transistor is coupled to the output of power-down inverter.

12. The circuit as recited in claim 9 wherein the sensing inverter is an odd number of sensing inverters coupled between the output of the Z-state circuit and the logical input of the CMOS NAND gate.

13. The circuit as recited in claim 1 wherein the output of the Z-state circuit is coupled to a load connected between the output and power supply.

14. The circuit as recited in claim 13 wherein the output is at power supply to ensure that no current flows into the p-type power-down enable Z-state circuit when the power-down input is at the power supply.

15. The circuit as recited in claim 13 wherein the gate terminal of the lower PMOS transistors is coupled to the output of the CMOS NAND gate while the gate terminal of the upper PMOS transistor is coupled to the output of power-down inverter.

16. The circuit as recited in claim 13 wherein the sensing inverter is an even number of sensing inverters coupled between the output of the Z-state circuit and the logical input of the CMOS NAND gate.

17. The circuit as recited in claim 16 wherein the CMOS NAND gate functions as the sensing inverter if the number of sensing inverters is null.

18. The circuit as recited in claim 1 wherein the CMOS NAND gate consists of two PMOS transistors and two NMOS transistors, wherein the gate terminal of each PMOS transistor is connected to the gate terminal of a separate NMOS transistor, with these device pair connections serving as inputs to the CMOS NAND gate circuit.

19. The circuit as recited in claim 18 wherein either of these device pair connections serves as the logical input to the CMOS NAND gate circuit.

20. The circuit as recited in claim 1 wherein the Z-state circuit is applied to all types of switching regulator without regard to architecture, topology, and schematics.

* * * * *